United States Patent [19]

Wilson et al.

[11] Patent Number: 5,214,137
[45] Date of Patent: May 25, 1993

[54] PREPARATION OF CELLULOSE DIACETATE BY RECYCLING PROCESSED FILM

[75] Inventors: Alan K. Wilson; Fred D. Barlow, Jr., both of Kingsport, Tenn.

[73] Assignee: Eastman Kodak Company, Rochester, N.Y.

[21] Appl. No.: 652,710

[22] Filed: Feb. 8, 1991

[51] Int. Cl.$^5$ .................. C08B 3/06; C08B 3/22; C08B 3/24; C08B 3/28
[52] U.S. Cl. ...................... 536/76; 536/78; 536/127
[58] Field of Search ............ 536/76, 78, 127

[56] References Cited

U.S. PATENT DOCUMENTS

| | | | |
|---|---|---|---|
| 3,696,058 | 10/1972 | Teti | 536/78 |
| 3,767,642 | 10/1973 | Campbell et al. | 536/69 |
| 4,078,916 | 3/1978 | Gerber et al. | 521/48 |
| 4,269,972 | 5/1981 | Yabune et al. | 536/71 |
| 4,439,605 | 3/1984 | Yabune et al. | 536/71 |

FOREIGN PATENT DOCUMENTS 481845 3/1938 United Kingdom .

OTHER PUBLICATIONS

"Grant and Hackh's Chemical Dictionary", fifth ed. 1987, p. 292.
Malm et al. in *Ind Eng Chem* 49(1), pp. 79-83 (1957), article entitled "Cellulose Derivatives".
Derwent Abstract WPI Acc. No. 90-190877/25 (1989).
Chemical Abstract CA82(22):141853k (Czech Patent 156,036) (1974).
Chemical Abstract CA107(4):31144g (SU Patent 1,282,064) (1987).
Chemical Abstract CA97(14):110935u (L. G. Tovkalo et al., *Plast. Massy.*, (7) 54 (1982)).
Chemical Abstract CA94(12):93566t (JP 55118829) (1979).
L. A. Hiller, *Journal of Polymer Science*, vol. X, No. 4, (1953), pp. 385-423.

*Primary Examiner*—John Kight, III
*Assistant Examiner*—Jeffrey Culpeper Mullis
*Attorney, Agent, or Firm*—Betty J. James; William P. Heath, Jr.

[57] ABSTRACT

A one step process for preparing cellulose diacetates from processed film having cellulose triacetate as a base. The process involves use of an organic acid such as acetic acid and a solvolysis agent such as an alkanol or water. Hydrogen and a hydrogenation catalyst are optionally employed. The process allows for a simple way of recycling a material that presently is not recycled to any appreciable extent.

10 Claims, No Drawings

PREPARATION OF CELLULOSE DIACETATE BY RECYCLING PROCESSED FILM

FIELD OF INVENTION

This invention relates to the preparation of cellulose diacetate (degree of substitution per anhydroglucose unit or "DS/AGU" of about 1.75 to about 2.7) from processed film having cellulose triacetate as a base. It relates to the recycling of a material in an economical and environmentally sound process.

BACKGROUND OF THE INVENTION

Cellulose diacetates (CDAs) are used in many applications from filter tow and plastics to pharmaceuticals and coatings. These CDAs are generally prepared by the acetylation of cellulose to the triacetate and then back hydrolyzed to the required DS/AGU. Currently plasticized cellulose triacetate (CTA) is used as a film base for photographic films, movie films, some graphic arts films, and in the USSR for some X ray films. From films that contain silver (B&W films, some graphic arts film, and X ray film) the silver is recovered. No large use of the CTA film base in areas other than these has been developed.

Josef Fabian in a Czech. patent (Cs 155,036 (1972): CA 82:141853k) discusses the recovery of cellulose esters used as film supports. In this patent, he took processed film that has had the image layers removed and then processed this material to recover the cellulose acetate (unspecified degree of substitution).

S. G. Tereshkova et al. disclose a method of restoring triacetate base of cine film (S. G. Tereshkova, E. A. Prodan, O. P. Ol'shevskaya, I. S. Panchev, SU 1,282,064 (1987): CA 107:31144g). This is a multistep process that used aqueous sulfuric acid, water (steam), and acetone to remove the image layers from photographic film. The final DS and form of the film is not mentioned.

The extrusion of "worn out" triacetate photo graphic films is disclosed by L. G. Tovkalo et al (L. G. Tovkalo, 0. A. Fridman, L. N. Malinin, *Plast. Massy.*, (7) 54 (1982): CA 97:110935u). The films are plasticized and extruded at 230° C. to produce reels or cassettes.

Fuji Photo Film Co., Ltd., of Japan disclosed the recycling of photographic films (JP 55118829 (1980): CA 94:93566t). In this patent, they discuss the embossing of scrap films prior to removing the emulsion layers in an "appropriate solution."

It is well known in the art that CDAs may be prepared by the hydrolysis or methanolysis of CTA; however, this type chemistry has not been applied to processed film base containing plasticizers, gelatin, dyes, and the like. The hydrolysis of cellulose triacetate has been carried out in acetic acid with no catalyst (L. A. Hiller, *J. Polymer Science*, 10, pp. 385-423 (1953)) with strong acid catalysts (H. Yabune, Y. Ikemoto, Y. Kato, M. Uchiada, U.S. Pat. No. 4,439,605 (1984) and K. C. Campbell, J. M. Davis, R. E. Woods, Jr., U.S. Pat. No. 3,767,642 (assigned to Celanese Corporation) (1973)), and where the strong acid catalyst was neutralized prior to hydrolysis (U.S. Pat. No. 4,269,972). None of these processes start with processed film.

Since the above processes for recycling processed film are multistep processes (removing emulsion followed by further treatment), there is a need for a one step, economical process to convert processed CTA film into a useful material such as CDA. This process must remove the gelatin, plasticizer, dyes, and other extraneous materials in the processed film. The process should be robust enough to handle materials from various sources without causing processing problems. The conditions of hydrolysis should not be severe enough to cause substantial molecular weight degradation of the polymer.

SUMMARY OF THE INVENTION

The present invention is directed to a process for preparing cellulose diacetate having a DS/AGU of about 1.75 to about 2.7 from processed photographic film having cellulose triacetate as a film base comprising:

(I) contacting:
  (A) said processed photographic film, with
  (B) an organic acid solution comprising
    (1) an organic acid, and
    (2) a solvolysis agent,
  at a temperature and for a time sufficient to promote formation of the desired cellulose diacetate.

DETAILED DESCRIPTION OF THE INVENTION

In accordance with the present invention, there is provided a method for the preparation of cellulose acetates of the required DS/AGU having repeating units of the structure:

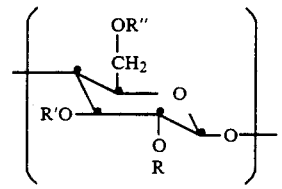

wherein R, R', and R" are selected from either acetyl or hydrogen.

A wide variety of starting processed films may be used for the process of the invention such as color movie film, black and white (B&W) movie film, graphic arts film, X ray film (CTA based), and the like. The only requirement is that the film base be cellulose triacetate (DS/AGU of about 2.85 to 3). Such processed film typically contains, in addition to CTA, a significant amount, e.g., within the range of about 5 to about 40 weight %, more typically within the range of about 15 to about 30 weight %, of one or more other materials and additives such as dyes; gelatin; plasticizers such as triphenyl phosphate, dibutyl phthalate, tricresyl phosphate, and the like; silver; silver salts; sulfur compounds; and the like. Basically, any of the materials present in processed or developed CTA based film prior to any other significant film base recycling steps can be used as a starting material for the process of the present invention.

The inherent viscosity of CTA used in film base is typically about 1 3 to about 1.6. The inherent viscosity (I.V.) of the CDA produced by the process of the invention is typically about 0.5 to about 2.00, preferably about 1 to about 1.8. I.V. can be determined in phenol/tetrachloroethane 60/40 w/w at 25° C. The number average molecular weight (Mn) is typically about 60,000 to about 250,000; the weight average molecular weight (Mw) is typically about 80,000 to about 500,000 as determined by gel permeation chromatography in N,N-dimethylformamide containing 0.5% lithium bromide using polystyrene standards.

A number of solvolysis agents are suitable for the practice of the present invention. Typically, n-alkanols having from 1-4 carbon atoms, water, benzyl alcohol and branched chain alkanols having 3 or 4 carbon atoms are contemplated. Mixtures of any two or more of such solvolysis agents are specifically contemplated. Exemplary reactive solvents (i.e., solvolysis agents) include, methanol, ethanol, n-propanol, n-butanol, isopropyl alcohol, benzyl alcohol, and water. Presently preferred solvolysis agents include methanol, ethanol, propanol, and water.

The organic acids for the process of the invention function primarily as solvents for the film and include weak Bronsted acids such as alkanoic acids having 1 to 5 carbon atoms. Exemplary solvents include acetic acid, formic acid, propionic acid, and butyric acid. Presently the preferred organic acid is acetic acid.

In the process of the invention it is preferred wherein said processed photographic film is present in an amount of about 1 to about 40%, based on the weight of said organic acid solution and said organic acid solution comprises about 65 to about 99 weight % of said organic acid and about 1 to about 35 weight % of said solvolysis agent. More preferred is wherein said processed photographic film is present in an amount of about 2.5 to about 20%, based on the weight of said organic acid solution, and said organic acid solution comprises about 90 to about 95 weight % of said organic acid and about 5 to about 10 weight % of said solvolysis agent.

The process of the invention is optionally carried out in the presence of hydrogen and a catalytic amount of a hydrogenation catalyst. The hydrogenation catalyst may be any of a number of catalysts but should be active in the presence of sulfur compounds. Currently the preferred hydrogenation catalyst is Raney nickel. A preferred amount of catalyst is about 0.1 to about 5% based on the total weight of the organic acid plus solvolysis agent. The hydrogen pressure for the preferred reaction may vary from about 0 to about 5000 psi (about 0 to about 34,473.50 Kpa) with the preferred range being about 25 to about 1800 psi (about 172.3 to about 12,410.46 Kpa). The most preferred range is about 50 to about 500 psi (about 344.7 to about 3447.35 Kpa). If hydrogen is not used in the process of the invention, the above pressures can be achieved by use of an inert gas such as nitrogen or argon.

Conditions suitable for the formation of the desired CDAs can vary widely. For example, reaction temperature can vary in the range of about 75° C. up to about 180° C., with temperatures in the range of about 100° C. up to about 160° C. being preferred. The presently most preferred temperature range for the practice of the present invention falls in the range of about 140° C. to 160° C.

Those of skill in the art readily recognize that contact times, reaction temperatures, and hydrogen pressure are interdependent, and thus can vary considerably. While the contact time may extend up to 48 hours at low reaction temperature, when the reaction temperature is within the preferred range, the contact time will fall within the range of 0.5 to 9 hours.

The process of the invention optionally can comprise one or more additional steps performed before or after solvolysis (and hydrogenation if used). Typically, the processed film is mechanically chopped (e.g., by a hammer mill) to increase the surface area to result in a more rapid and uniform process. Also, the chopped film contains materials that are insoluble in the organic acid. Thus, it is often desirable to remove such insolubles (e.g., undissolved gelatin and silver compounds) by simple separation techniques such as filtration. The separation of the insoluble material can be performed any time after dissolving the processed film in the organic acid. In the case of B&W, graphic arts, and X ray films, the filtration may be done before the solvolysis (and hydrogenation if used) in order to recover the silver compounds. In a preferred embodiment, the reaction mixture is filtered after performing the basic process of the invention. Thus, a preferred process of the invention comprises the additional step of:

(II) filtering the reaction mixture from step (I) to result in partially purified cellulose diacetate separated from insoluble material.

After performing step (II) it is further preferred that the following additional step be performed:

(III) precipitating the partially purified cellulose diacetate for step (II) by contacting with a non-solvent for cellulose diacetate.

Typical non-solvents for CDA include methanol, isopropanol, n-propanol, water and ethanol. The yield of CDA by following the process of the invention is typically at least about 50%, based on the weight of CTA in the chopped film. Preferred yield is at least about 75%.

The invention will now be described in greater detail by reference to the following non limiting examples.

EXAMPLES

In the following examples, except where noted, the materials used were loaded into a 1 liter, stainless steel rocking autoclave. The reactor was sealed, pressurized with the appropriate gas, and heated to the contact temperature. The heat up time was typically 1 to 2 hours. The reaction mixture was rocked at the indicated temperature for the indicated reaction time. Then the reaction mixture was allowed to cool to room temperature, which typically took 2 to 3 hours. The insoluble gelatin and any hydrogenation catalyst were removed by filtration. The resulting filtrate was then drowned into an organic solvent, typically methanol, with a high shear mixer for agitation (Omni Mixer Homogenizer from Omni International, Waterbury, CT, U.S.A.). The resulting slurry was then filtered and the solids washed with methanol. The products typically were characterized by proton NMR spectroscopy for DS, gel permeation chromatography (N,N-dimethyl formamide solvent, polystyrene reference standard), intrinsic viscosity, inductively coupled plasma for metals, UV-visible spectroscopy for color, differential scanning calorimetry, and other methods familiar to one well versed in the art.

A number of operating conditions are suitable for obtaining NMR spectra of cellulose esters. The presently preferred conditions are as follows: $^1$H NMR data are obtained with either a JEOL Model GX-400 or a JEOL Model GX-270 NMR spectrometer (available from JEOL USA, Peabody, MA, U.S.A.) operated at 400 MHz or 270 MHz. Sample tube size is 5 mm. The sample concentration is 30 mg/l of dimethylsulfoxide d6/1-2 drops trifluoroacetic acid (DMSO-d6 -TFA). The temperature is 80° C., the pulse delay is 5 sec, and 8 to 64 scans are acquired for each experiment. Chemical shifts are reported in ppm from tetramethylsilane, with residual DMSO as an internal standard (2.49 ppm).

GPC data was acquired using a Waters Model 150C High Temperature Gel Permeation Chromatograph operating at 60° C. The mobile phase was DMF containing 0.5% LiBr. Sample size was 20-25 mg/10 ml and the injection size was 100 µl. Molecular weights are reported in polystyrene equivalents.

Inherent viscosity was measured using a Schott Gerate AVS24 instrument operating at 25° C. Sample concentration was 0.5 g per 100 ml of phenol/tetrachloroethane 60/40 w/w.

CIELAB color coordinates were run on a UV-visible spectrophotometer or colorimeter in methylene chloride/methanol 90/10 and calculated as defined by the International Commission on Illumination (CIE) based in France.

Tg and Tm were determined with a Du Pont 9900 data station with a Du Pont Model 912 differential scanning calorimeter. A sample size of about 5 mg was heated at 20° C./minute from 50°-275° C., quenched, and heated again using the same cycle.

EXAMPLE 1

Reagents set forth below were subjected to the standard procedure described above except a Parr mechanically stirred Hastalloy C autoclave was used under the indicated reaction conditions. The results, in terms of identity and yield of the desired cellulose acetate, and key analyses of the product are also set forth below.

| Starting Material | Chopped color movie film (from a United States source) |
|---|---|
| Weight (g) | 25 |
| Hydrogenation Catalyst | None |
| Gas Used for Pressurizing | $N_2$ |
| Initial Pressure, psig | 200 |
| Solvolysis Agent | Methanol |
| Amount (ml) | 35 |
| Solvent | Acetic Acid |
| Amount (ml) | 400 |
| Temperature (°C.) | 155 |
| Contact Time (hr) | 2.75 |
| Cellulose Diacetate | |
| Key Analyses | DS/AGU 2.35, IV 1.15, Mn 133,400, Mw 169,500, Mz 263,200, ppm S 9, ppm P 24, ppm Ag 1, CIELAB Color L 88.62, a −0.18, b 25.05 |
| Yield (% based on assumption film contains 76% CTA) | 75 |

This example demonstrates the general procedure for methanolysis of color movie film. CIELAB Color L is +lightness and −darkness, a +Red and −green and b+yellow and −blue as determined by UV-visible spectroscopy.

EXAMPLE 2

Reagents set forth below were subjected to the standard procedure described above except a Parr mechanically stirred Hastalloy C autoclave was used under the indicated reaction conditions. The results, in terms of identity and yield of the desired cellulose acetate, and key analyses of the product are also set forth below.

| Starting Material | Chopped color movie film (US) |
|---|---|
| Weight (g) | 25 |
| Hydrogenation Catalyst | Raney Nickel (3 g) |
| Gas Used for Pressurizing | $H_2$ |
| Initial Pressure, psig | 200 |
| Solvolysis Agent | Methanol |
| Amount (ml) | 35 |
| Solvent | Acetic Acid |
| Amount (ml) | 400 |
| Temperature (°C.) | 155 |
| Contact Time (hr) | 2.75 |
| Cellulose Diacetate | |
| Key Analyses | DS 2.35, IV 1.32, Mn 154,200, Mw 223,800, Mz 313,900, ppm S 0, ppm P 11, ppm Ni 4, ppm Ag 0, CIELAB Color L 96.98, a −0.70, b 7.35 |
| Yield (% based on assumption film contains 76% CTA) | 72 |

This example indicates the advantage of adding a hydrogenation catalyst and hydrogen to the methanolysis of movie film.

EXAMPLE 3

Reagents set forth below were subjected to the standard procedure described above except a Parr mechanically stirred Hastalloy C autoclave was used under the indicated reaction conditions. The results, in terms of identity and yield of the desired cellulose acetate, and key analyses of the product are also set forth below.

| Starting Material | Chopped color movie film (US) |
|---|---|
| Weight (g) | 25 |
| Hydrogenation Catalyst | None |
| Gas Used for Pressurizing | $N_2$ |
| Initial Pressure, psig | 200 |
| Solvolysis Agent | Water |
| Amount (ml) | 16 |
| Solvent | Acetic Acid |
| Amount (ml) | 400 |
| Temperature (°C.) | 155 |
| Contact Time (hr) | 2.5 |
| Cellulose Diacetate | |
| Key Analyses | DS 2.41, IV 1.12, Mn 139,500, Mw 197,000, Mz 276,200, ppm S 0, ppm P 12, ppm Ni 2, ppm Ag 0, CIELAB Color L 92.82, a −0.50, b 15.76 |
| Yield (% based on assumption film contains 76% CTA) | 73 |

This example illustrates the general procedure for hydrolysis of movie film.

EXAMPLE 4

Reagents set forth below were subjected to the standard procedure described above except a Parr mechanically stirred Hastalloy C autoclave was used under the indicated reaction conditions. The results, in terms of identity and yield of the desired cellulose acetate, and key analyses of the product are also set forth below.

| Starting Material | Chopped color movie film (US) |
|---|---|
| Weight (g) | 25 |
| Hydrogenation Catalyst | Raney Nickel (3 g) |
| Gas Used for Pressurizing | $H_2$ |
| Initial Pressure, psig | 200 |
| Solvolysis Agent | Water |
| Amount (ml) | 16 |

| | |
|---|---|
| -continued | |
| Solvent | Acetic Acid |
| Amount (ml) | 400 |
| Temperature (°C.) | 155 |
| Contact Time (hr) | 2.5 |
| Cellulose Diacetate | |
| Key Analyses | DS 2.32, IV 1.32, Mn 133,500, Mw 194,300, Mz 262,600, ppm S 0, ppm P 0, ppm Ni 3, ppm Ag 0, CIELAB Color L 96.82, a −1.00, b 8.48 |
| Yield (% based on assumption film contains 76% CTA) | 73 |

This example illustrates the general procedure for hydrolysis with hydrogenation of movie film.

EXAMPLE 5

Reagents set forth were combined in a 300 ml round-bottomed flask equipped with a mechanical stirrer, a thermometer, and a reflux condenser and mixed under the indicated reaction conditions. The results, in terms of identity and yield of the desired cellulose acetate, and key analyses of the product are also set forth below.

| | |
|---|---|
| Starting Material | Chopped color movie film (US) |
| Weight (g) | 25 |
| Hydrogenation Catalyst | None |
| Gas Used for Pressurizing | $N_2$ |
| Initial Pressure, psig | atm |
| Solvolysis Agent | methanol |
| Amount (ml) | 30 |
| Solvent | Acetic Acid |
| Amount (ml) | 250 |
| Temperature (°C.) | 90 |
| Contact Time (hr) | 24 |
| Cellulose Diacetate | |
| Key Analyses | DS 2.75, IV 1.85, Mn 227,300, Mw 428,300, Mz 821,600, ppm S 110, ppm P 52, ppm Ag 172, CIELAB Color L 74.08, a 1.17, b 19.48, Tg 181° C., Tm 217° C. |
| Yield (% based on assumption film contains 76% CTA) | 87 |

This example illustrates the use of lower temperatures for the methanolysis of movie film.

EXAMPLE 6

This illustrates the physical properties of commercial plastic grade cellulose diacetate prepared by the strong acid catalyzed hydrolysis of cellulose triacetate.

| | |
|---|---|
| Cellulose Diacetate | |
| Key Analyses | DS 2.46, IV 1.31, Mn 133,200, Mw 256,400, Mz 435,000, ppm S 48, ppm P 0, ppm Ag 0, CIELAB Color L 99.96, a −0.20, b 0.47 |

EXAMPLE 7

Reagents set forth below were subjected to the standard procedure described above except the chopped B&W film was dissolved in hot (about 100° C.) acetic acid and filtered to remove silver and undissolved gelatin before adding to autoclave and treated according to the indicated reaction conditions. The results, in terms of identity and yield of the desired cellulose acetate, and key analyses of the product are also set forth below.

| | |
|---|---|
| Starting Material | Chopped B&W movie film (from a Soviet Union source) |
| Weight (g) | 37.5 |
| Hydrogenation Catalyst | Raney Nickel (4.5 g) |
| Gas Used for Pressurizing | $H_2$ |
| Initial Pressure, psig | 200 |
| Solvolysis Agent | Methanol |
| Amount (ml) | 52.5 |
| Solvent | Acetic Acid |
| Amount (ml) | 400 |
| Temperature (°C.) | 155 |
| Contact Time (hr) | 2.75 |
| Cellulose Diacetate | |
| Key Analyses | DS 2.45, IV 1.63, Mn 163,800, Mw 259,100, Mz 393,500, ppm S 4, ppm P 4, ppm Ag 0, ppm Ni 6, CIELAB Color L 98.19, a −0.77, b 2.65 |
| Yield (% based on assumption film contains 76% CTA) | 59 |

This example demonstrates that the procedure for methanolysis of movie film is general for black and white movie film also.

EXAMPLE 8

Reagents set forth below were subjected to the standard procedure described above and treated according to the indicated reaction conditions. The results, in terms of identity and yield of the desired cellulose acetate, and key analyses of the product are also set forth below.

| | |
|---|---|
| Starting Material | Chopped color movie film (USSR) |
| Weight (g) | 25 |
| Hydrogenation Catalyst | Raney Nickel (3.0 g) |
| Gas Used for Pressurizing | $H_2$ |
| Initial Pressure, psig | 200 |
| Solvolysis Agent | Methanol |
| Amount (ml) | 35 |
| Solvent | Acetic Acid |
| Amount (ml) | 400 |
| Temperature (°C.) | 155 |
| Contact Time (hr) | 2.75 |
| Cellulose Diacetate | |
| Key Analyses | DS 2.56, IV 1.38, Mn 135,300, Mw 225,600, Mz 352,500, ppm S 8, ppm P 24, ppm Ag 0, ppm Ni 17, CIELAB Color L 97.42, a −0.81, b 4.89 |
| Yield (% based on assumption film contains 76% CTA) | 82 |

This example demonstrates that the procedure for methanolysis of movie film is general for Russian color movie film also.

EXAMPLE 9

Reagents set forth below were subjected to the standard procedure described above except the chopped graphic arts film was dissolved in hot acetic acid and filtered to remove silver and undissolved gelatin before adding to autoclave and treated according to the indicated reaction conditions. The results, in terms of identity and yield of the desired cellulose acetate, and key analyses of the product are also set forth below.

| | |
|---|---|
| Starting Material | Chopped graphic arts film (USSR) |
| Weight (g) | 37.5 |
| Hydrogenation Catalyst | Raney Nickel (4.5 g) |
| Gas Used for Pressurizing | $H_2$ |
| Initial Pressure, psig | 200 |
| Solvolysis Agent | Methanol |
| Amount (ml) | 52.5 |
| Solvent | Acetic Acid |
| Amount (ml) | 600 |
| Temperature (°C.) | 155 |
| Contact Time (hr) | 2.75 |
| Cellulose Diacetate | |
| Key Analyses | DS 2.54, IV 1.17, Mn 141,500, Mw 225,200, Mz 335,400, ppm S 0, ppm P 0, ppm Ag 0, ppm Ni 9, CIELAB Color L 99.16 a −0.47, b 2.65 |
| Yield (% based on assumption film contains 76% CTA) | 82 |

This example demonstrates that the procedure for methanolysis of movie film is general for graphic arts film also.

The invention has been described in detail with particular reference to preferred embodiments thereof, but it will be understood that variations and modifications can be effected within the spirit and scope of the invention.

We claim:

1. A process for preparing cellulose diacetate having a DS/AGU of about 1.75 to about 2.7 from processed photographic film having cellulose triacetate having a DS/AGU of about 2.85 to 3 as a film base comprising:
   (I) contacting:
      (A) said processed photographic film, with
      (B) an organic acid solution comprising
         (1) an organic acid, and
         (2) a solvolysis agent,
         at a temperature and for a time sufficient to promote formation of the desired cellulose diacetate,
   (II) filtering the reaction mixture for step (I) to result in partially purified cellulose diacetate separated from insoluble material, and
   (III) precipitating the partially purified cellulose diacetate for step (II) by contacting with a non-solvent for cellulose diacetates selected from the group consisting of methanol, isopropanol, n-propanol, and ethanol
wherein said organic acid solution of (I)(B) additionally comprises a catalytic amount of a hydrogenation catalyst.

2. The process of claim 1 wherein said processed photographic film is present in an amount of about 1 to about 40%, based on the weight of said organic acid solution, and said organic acid solution comprises about 65 to about 99 weight % of said organic acid and about 1 to about 35 weight % of said solvolysis agent, and further wherein said organic acid solution additionally comprises about 0.1 to about 5% of a hydrogenation catalyst, said percentages being based on the total weight of the organic acid plus solvolysis agent.

3. The process of claim 2 wherein said hydrogenation catalyst is Raney nickel.

4. The process of claim 1 wherein said processed photographic film and said organic acid solution are contacted with hydrogen.

5. The process of claim 3 wherein said processed photographic film and said organic acid solution are contacted with hydrogen.

6. The process of claim 4 carried out at a hydrogen pressure of about 0 to about 5000 psig and a temperature of about 60° C. to about 180° C.

7. The process of claim 4 carried out at a hydrogen pressure of about 25 to about 1800 psig, a temperature of about 100° C. to about 160° C., and for a contact time of about 0.25 to about 48 hours.

8. The process of claim 4 carried out at a hydrogen pressure of about 50 to about 500 psig, a temperature of about 140° C. to about 160° C., and for a contact time of about 0.5 to about 9 hours.

9. The process of claim 1 wherein
   component (A) is present at about 1 to about 40% by weight, based on the weight of component (B);
   component (B) comprises
      (1) about 65 to about 99 weight % of said organic acid selected from the group consisting of acetic acid, formic acid, propionic acid, butyric acid, and a mixture thereof, and
      (2) about 1 to about 35 weight % of said solvolysis agent selected from the group consisting of an alkanol having 1 to 4 carbon atoms, water, benzyl alcohol, and a mixture thereof, wherein the amount of components (I)(B)(1) and (I)(B)(2) total 100%, and
      (3) about 0.1 to about 5% of a hydrogenation catalyst,
   wherein the amount of component (I)(B)(3) is based on the weight of component (I)(B)(1) plus component (I)(B)(2), and further comprising
   (C) hydrogen, at a partial hydrogen pressure of about 25 to about 1800 psig, at a temperature of about 60° C. to about 180° C. and for a reaction time of about 0.25 to about 48 hours, to form a reaction mixture containing the desired cellulose diacetate.

10. The process of claim 9 wherein said processed photographic film is color movie film, black and white movie film, X-ray film, graphic arts film, or a mixture thereof, and is present in an amount of about 2.5 to about 20%, based on the weight of said organic acid solution, and wherein component (I)(B) comprises:
   (1) about 90 to about 95 weight % of acetic acid, and
   (2) about 5 to about 10 weight % of methanol, ethanol, propanol, water, or a mixture thereof,
   wherein the amount of component (I)(B)(1) and component (I)(B)(2) total 100%, and (3) about 0.1 to about 5% Raney nickel; wherein the amount of component (I)(B)(3) is based on the weight of component (I)(B)(1) plus component (I)(B)(2), and
   wherein the partial hydrogen pressure is about 50 to about 500 psig; the temperature for step (I) is about 100° C. to about 160° C.; the contact time for step (I) is about 0.5 to about 9 hours; and the non-solvent for step (III) is methanol, water, ethanol, or a mixture thereof.

* * * * *